United States Patent

Yasuda

[11] Patent Number: 6,166,770
[45] Date of Patent: *Dec. 26, 2000

[54] CAMERA FOCUS CONTROL ACCORDING TO EXTRACTION RANGE SIZE AND/OR ZOOM RATE

[75] Inventor: Hitoshi Yasuda, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/685,178

[22] Filed: Jul. 18, 1996

[30] Foreign Application Priority Data

Jul. 26, 1995 [JP] Japan .................................... 7-190380

[51] Int. Cl.$^7$ .................................................. H04N 5/232
[52] U.S. Cl. .......................................... 348/350; 348/354
[58] Field of Search .................................... 348/356, 355, 348/354, 351, 350, 349, 345; 396/89

[56] References Cited

U.S. PATENT DOCUMENTS

| | | | |
|---|---|---|---|
| 4,872,058 | 10/1989 | Baba | 348/356 |
| 5,055,933 | 10/1991 | Hidaka | 348/356 |
| 5,570,236 | 10/1996 | Hirasawa | 348/345 |
| 5,629,735 | 5/1997 | Kaneda | 348/345 |
| 5,712,474 | 1/1998 | Naneda | 348/208 |

*Primary Examiner*—Chris S. Kelley
*Attorney, Agent, or Firm*—Robin, Blecker & Daley

[57] ABSTRACT

An image pickup apparatus is provided with a focus detecting device for detecting a state of focus from a picked-up image signal outputted from an image sensor, and an electronic zoom device for electrically magnifying the picked-up image signal. The image pickup apparatus is arranged to control an operation characteristic of the focus detecting device on the basis of the operating state of the electronic zoom device.

19 Claims, 6 Drawing Sheets

H=h1+h2+h3+h4+h5

H=h1+h2+h3

CAMERA FOCUS CONTROL ACCORDING TO EXTRACTION RANGE SIZE AND/OR ZOOM RATE

BACKGROUND OF THE INVENTION

1. Field of the Invention

This invention relates to an automatic focusing device for use in video cameras of varied kinds and the like.

2. Description of the Related Art

The recent advancement of video apparatuses such as video cameras is conspicuous. They are now equipped in general with devices for automatic focusing, automatic iris control and high-magnification zooming and further with an electronic zoom function of electrically magnifying images by image processing actions. These apparatuses thus are being arranged to have improved operability in every part as well as proliferated functions.

With respect to the automatic focusing device, it is becoming a main trend to arrange the device for focus adjustment to detect the sharpness of a picture from a video signal obtained by photo-electrically converting an object image with an image sensor and by controlling the position of a focusing lens so as to reach a position where the sharpness takes a maximum value.

It is generally practiced to evaluate the image sharpness through the level (a focus evaluation value) of a high frequency component of a video signal extracted by a band-pass filter of a certain frequency band.

In taking a picture of an ordinary object of shooting, for example, the level of the high frequency component, i.e., a focus evaluation value, increases accordingly as focus on the object of shooting obtained by the position of the focusing lens being adjusted comes nearer to an in-focus state, as shown in FIG. 2. A position at which the level of the high frequency component takes a maximum value is considered to be an in-focus point.

In the process of focusing, the focusing lens is moved by a predetermined amount and, if the focus evaluation value then becomes smaller than the value obtained at the last position of the focusing lens, the focusing lens is made to be reversely moved. On the other hand, if the focus evaluation value becomes larger than the value obtained at the last position of the focusing lens, the focusing lens is made to be moved further in the same direction. The in-focus state can be maintained by repeating the above operations.

In making focus evaluation in this manner, in order to avoid the evaluation being affected by a noise, the focus evaluation value is considered to have decreased only when it decreases at least by a predetermined value. This predetermined value is called a reversal threshold value.

FIG. 3 shows how the focus evaluation value is extracted from an image pickup plane. In FIG. 3, reference numeral 301 denotes an image pickup plane and reference numeral 302 denotes a focus-evaluation-value extracting range. In this case, a peak value h1, h2, h3, h4 or h5 is obtained on each of scanning lines in the horizontal direction. A value which is obtained by adding up these peak values included within the range 302 in the vertical direction is used as a focus evaluation value H (H=h1+h2+h3+h4+h5).

FIG. 4 shows how the focus evaluation value is extracted from an image pickup plane magnified two diameters, i.e., enlarged two times, by an electronic zoom function. Reference numeral 301 denotes an image pickup plane obtained prior to being magnified, reference numeral 401 denotes an image pickup plane to be magnified and reference numeral 402 denotes a focus-evaluation-value extracting range.

If the picked-up image plane is magnified by the electronic zoom function without varying the focus-evaluation-value extracting range, the focus-evaluation-value extracting range would become larger than the image pickup plane, so that there is a possibility of causing an in-focus part to be located outside of the image pickup plane.

Therefore, it is conceivable to arrange the image pickup apparatus to be capable of making the focus-evaluation-value extracting range smaller, as shown in FIG. 4, when the image pickup plane is magnified by the electronic zooming or the like, so that focus adjustment can be reliably made without having the in-focus part outside of the image pickup plane even during the electronic zooming.

However, the arrangement mentioned above still remains to be improved further. Since the focus evaluation value is obtained by adding up the peak values of the focus evaluation values of horizontal scanning lines included within the range in the vertical direction, a reduction of the focus-evaluation-value extracting range during the process of electronic zooming as shown in FIG. 4 causes the focus evaluation value H to become "H=h1+h2+h3" which is smaller than an evaluation value normally obtained.

Therefore, in such a case, the reversal threshold value which is set for the larger normal evaluation value becomes too large and thus causes a point of time at which the driving direction of the focusing lens is to be reversed to become too late. As a result, an image thus picked up appears in an unstably focused state.

SUMMARY OF THE INVENTION

It is an object of this invention to provide an image pickup apparatus arranged to be capable of always accurately and stably making focus adjustment without deteriorating the performance of a focus adjusting means by effectively preventing its operation from becoming unstable even when a range of extracting a focus evaluation value is changed or even when an image magnifying rate is changed by an electronic zoom function.

It is another object of this invention to provide an image pickup apparatus having an electronic zoom function wherein an automatic focusing system is arranged to stably and accurately operate.

To attain these objects, an image pickup apparatus arranged as a preferred embodiment of this invention comprises extracting means for extracting, as a focus evaluation value, a predetermined high frequency component of a video signal corresponding to an extracting range arbitrarily set within an image pickup plane, moving means for moving a focus adjusting member along an optical axis, focus adjusting means for adjusting focus by causing the moving means to move the focus adjusting member in such a way as to maximize the focus evaluation value, extracting range varying means for varying the extracting range, and control means for controlling an operation of the focus adjusting means according to a size of the extracting range for the focus evaluation value.

An image pickup apparatus arranged as another preferred embodiment of this invention comprises extracting means for extracting, as a focus evaluation value, a predetermined high frequency component of a video signal corresponding to an extracting range arbitrarily set within an image pickup plane, moving means for moving a focus adjusting member along an optical axis, focus adjusting means for adjusting focus by causing the moving means to move the focus adjusting member in such a way as to maximize the focus evaluation value, image magnifying means for electrically magnifying an image within the image pickup plane, and control means for controlling an operation of the focus adjusting means according to a magnifying rate of the image magnifying means.

An image pickup apparatus arranged as a further preferred embodiment of this invention comprises extracting means for extracting, as a focus evaluation value, a predetermined high frequency component of a video signal corresponding to an extracting range arbitrarily set within an image pickup plane, moving means for moving a focus adjusting member along an optical axis, focus adjusting means for adjusting focus by causing the moving means to move the focus adjusting member in such a way as to maximize the focus evaluation value, image magnifying means for electrically magnifying an image within the image pickup plane, and control means for varying the extracting range according to the magnifying rate of the image magnifying means and for controlling an operation of the focus adjusting means according to a size of the extracting range.

The above and other objects and features of this invention will become apparent from the following detailed description of an embodiment thereof taken in conjunction with the accompanying drawings.

DETAILED DESCRIPTION OF THE PREFERRED EMBODIMENT

An image pickup apparatus which is arranged by way of example as an embodiment of this invention is described in detail below with reference to the drawings.

Figure 1:
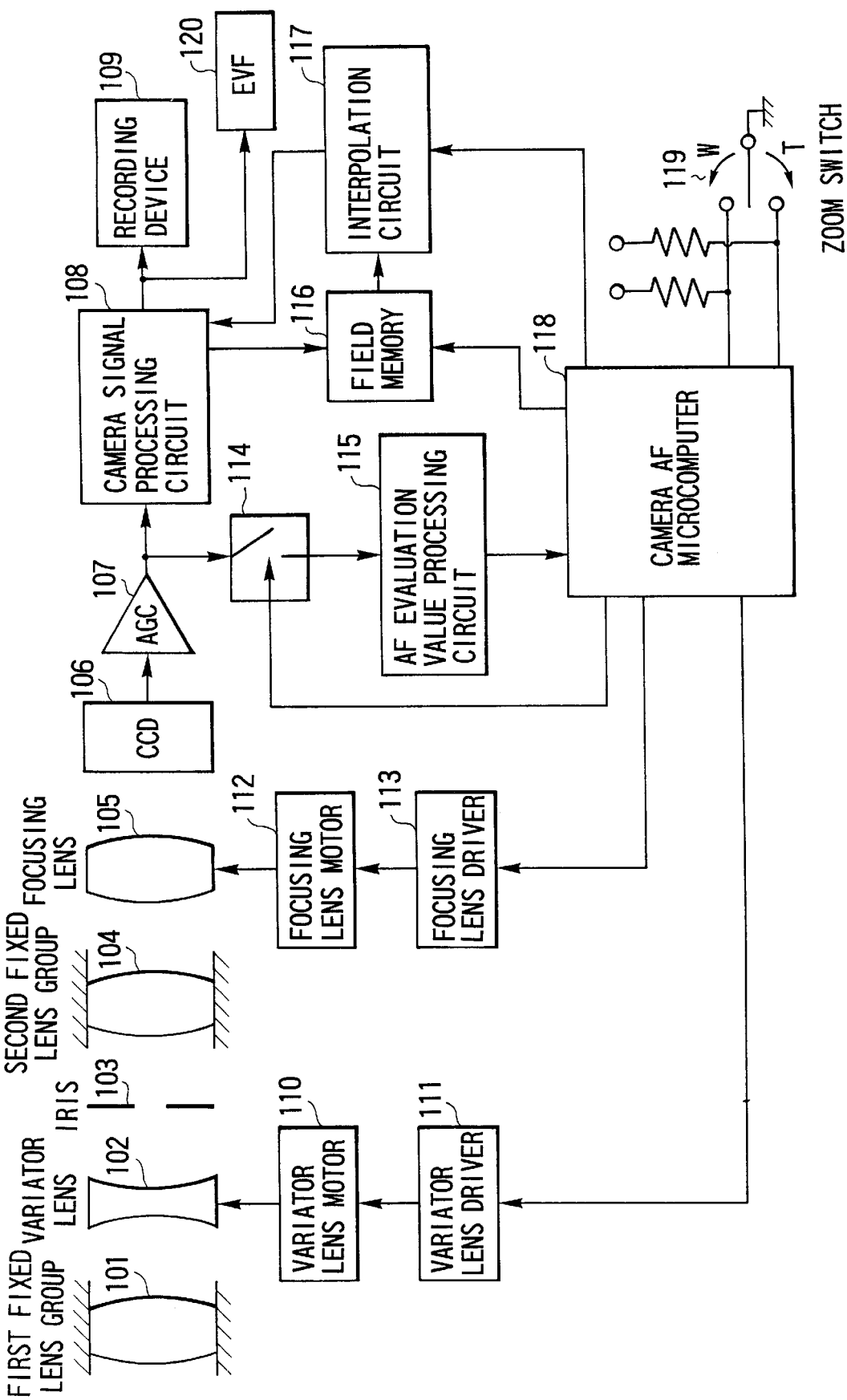
FIG. 1 is a block diagram showing the arrangement of an embodiment of this invention.
Figure 2:
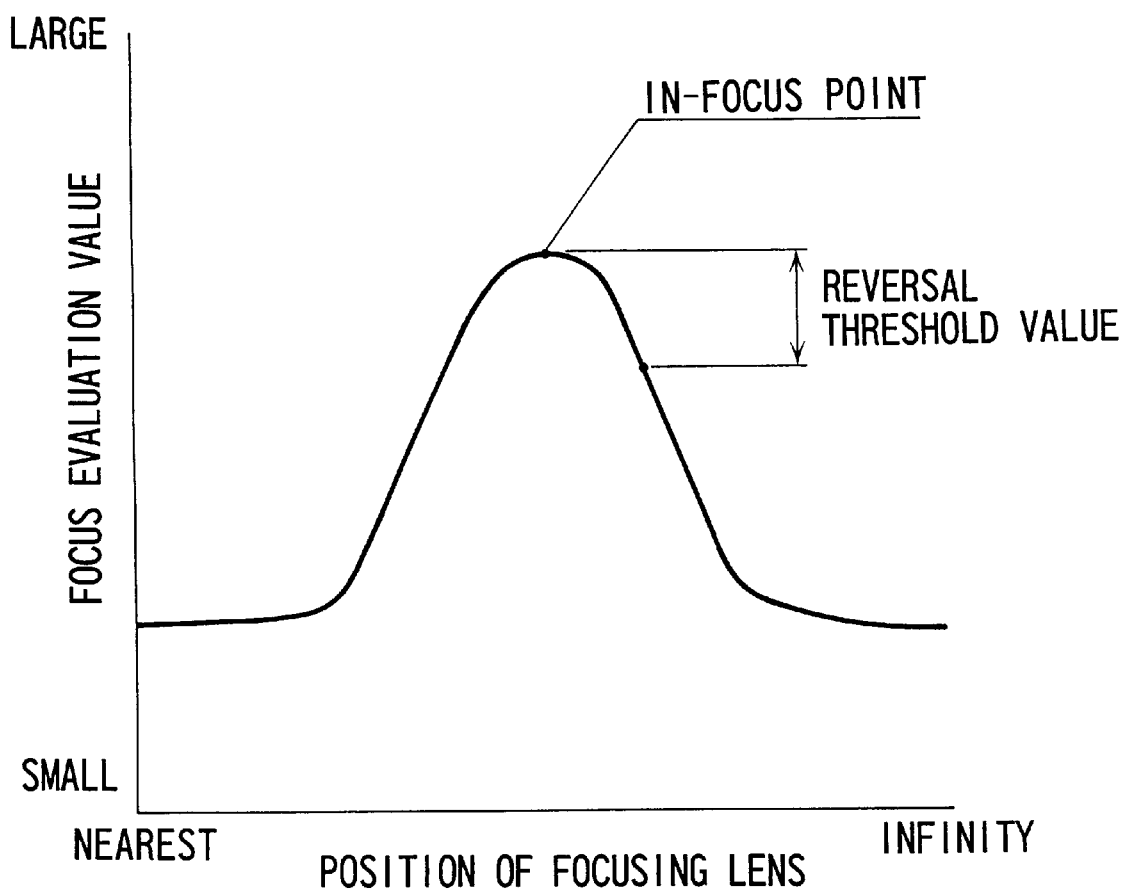
FIG. 2 is a graph showing the relationship between the position of a focusing lens and a focus evaluation value.
Figure 3:
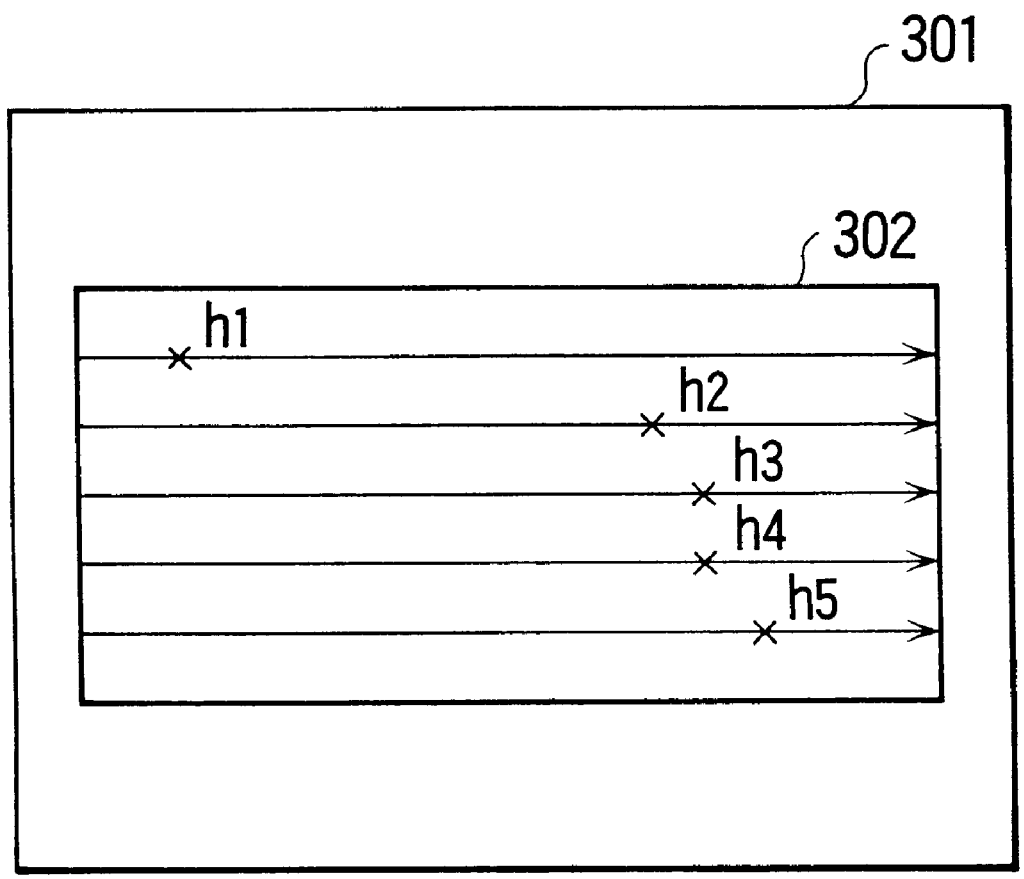
FIG. 3 shows a focus-evaluation-value extracting range in relation to a normal image pickup plane.

FIG. 1 is a block diagram showing the arrangement of the video camera, to which this invention is applied. The video camera includes a first fixed lens group 101, a variator lens 102 arranged to perform a magnification varying action, an iris 103, a second fixed lens group 104, and a focusing compensation lens 105 (hereinafter referred to as a focusing lens) arranged to act to compensate for changes of the focal plane caused by a magnification varying action as well as to act as a focus adjusting member.

An image sensor 106 is a CCD or the like. An AGC amplifier 107 is arranged to amplify a picked-up image signal outputted from the image sensor 106 and to control the luminance level of the picked-up image signal to remain at a predetermined level.

A camera signal processing circuit 108 is arranged to convert the picked-up image signal outputted from the AGC amplifier 107 into a standardized video signal by performing a predetermined processing action including the forming of luminance and color-difference signals, the gamma conversion, the blanking process, etc., in a predetermined manner. A recording device 109 is arranged to record the video signal outputted from the camera signal processing circuit 108.

An electronic viewfinder (EVF) 120 is arranged to display the video signal outputted from the camera signal processing circuit 108 for monitoring.

Actuators 110 and 112 are stepping motors or the like and are arranged to move respectively the variator lens 102 and the focusing lens 105. Drivers 111 and 113 are arranged to drive respectively the actuators 110 and 112 in response to signals from a camera AF microcomputer 118, which will be described later. These actuators constitute a moving means of this invention.

A gate circuit 114 is arranged to pass only a portion of the picked-up image signal corresponding to an extracting range set within an image pickup plane to be used for adjusting focus. The picked-up image signal corresponding to an arbitrary extracting range within the image pickup plane can be extracted by controlling the opening and closing timing of the gate circuit 114. The opening and closing timing of the gate circuit 114, i.e., a focus-evaluation-value extracting range within the image pickup plane, is controlled by the camera AF microcomputer 118.

An AF evaluation value processing circuit 115 is arranged to extract, as a focus evaluation value, a high frequency component which varies according to the state of focus, from the picked-up image signal which corresponds to the focus-evaluation-value extracting range of the image pickup plane and which is obtained through the gate circuit 114. The output of the AF evaluation value processing circuit 115 is supplied to the camera AF microcomputer 118.

The gate circuit 114 and the AF evaluation value processing circuit 115 constitute an extracting means of this invention.

A field memory 116 is arranged to store one field amount of the video signal composed of the luminance and color-difference signals formed by the camera signal processing circuit 108 and to have writing and reading actions controlled by the camera AF microcomputer 118. An interpolation circuit 117 is arranged to perform an interpolating action on the video signal read from the field memory 116 according to a signal from the camera AF microcomputer 118. The field memory 116 and the interpolation circuit 117 constitute an image magnifying means for performing an image magnifying process, i.e., the electronic zoom function, of this invention.

The camera AF microcomputer 118 is arranged to control the whole system of the image pickup apparatus including the AF (automatic focusing) and electronic zoom functions. The AF microcomputer 118 controls the driver 113 on the basis of a signal from the AF evaluation value processing circuit 115 to drive the actuator 112 in such a way as to move the focusing lens 105 along the optical axis in performing an AF action.

The position of the focusing lens 105 is thus adjusted to an in-focus point where the level of the focus evaluation value outputted from the AF evaluation value processing circuit 115 comes to show a maximum value. This function corresponds to a focus adjusting means of this invention.

The camera AF microcomputer 118 controls also the driver 111 according to the operated state of the zoom switch 119 to drive the actuator.110 in such a way as to move the variator lens 102 for optical zooming. When the variator lens 102 is driven toward the telephoto side and then reaches the telephoto end position, where it becomes immovable any further, the optical zooming shifts to electronic zooming, and an electronic image magnifying process is performed.

The electronic zoom function is carried out also on the basis of an instruction given from the camera AF microcomputer 118. In this instance, a readout range of reading out one field amount of the video signal stored in the field memory 116 is reduced from the size of one picture plane. The larger the magnifying rate of the electronic zooming is, the smaller the readout range. The reduced readout range can be displayed in a state of being enlarged to the full size of the monitor picture plane by changing the reading rate at which the image within the readout range is read out. In other words, the image within the reduced readout range can be displayed on the monitor picture plane in a state of being enlarged to a full size of the monitor picture plane. The AF microcomputer 118 is arranged to control the readout range and the reading rate of the image from the field memory 116 according to the magnifying rate of the electronic zooming.

The process of enlarging the image read out from the field memory 116 to the full size of the monitor picture plane causes information dropouts between picture elements and between scanning lines. The dropouts cause deterioration in picture quality. The interpolation circuit 117 is arranged to prevent the picture quality deterioration by replacing the dropout parts, for example, with average values of information, etc., of picture elements and scanning lines located on both sides of these dropout parts.

The arrangement of shifting the optical zooming to the electronic zooming mentioned above may be changed to arrange an electronic zoom mode to permit the electronic zooming irrespective of the optical zooming. In other words, in the electronic zoom mode, the field memory 116 and the interpolation circuit 117 are controlled in such a way as to enlarge or reduce the image pickup plane according to an input from the zoom switch 119.

In carrying out the electronic zooming action, the camera AF microcomputer 118 executes a process whereby the gate circuit 114 is controlled to vary the focus-evaluation-value extracting range to optimize the focus evaluation value, and the action of the focus adjusting means is restricted according to the changes of the focus-evaluation-value extracting range and, eventually, according to the image magnifying process of the electronic zoom action.

The video camera according to the embodiment of this invention is configured as described above. The control which is executed within the camera AF microcomputer 118 over the focus-evaluation-value extracting range during the electronic zooming and which is a feature of this invention is described below with reference to FIG. 5 which is a flow chart. FIG. 6 is a flow chart showing an AF process including an action of restricting the focus adjusting means according to the changes caused in size of the focus-evaluation-value extracting range under the control shown in FIG. 5.

Control means according to this invention is realized by the function of the camera AF microcomputer 118 by which these processes are executed.

Figure 5:
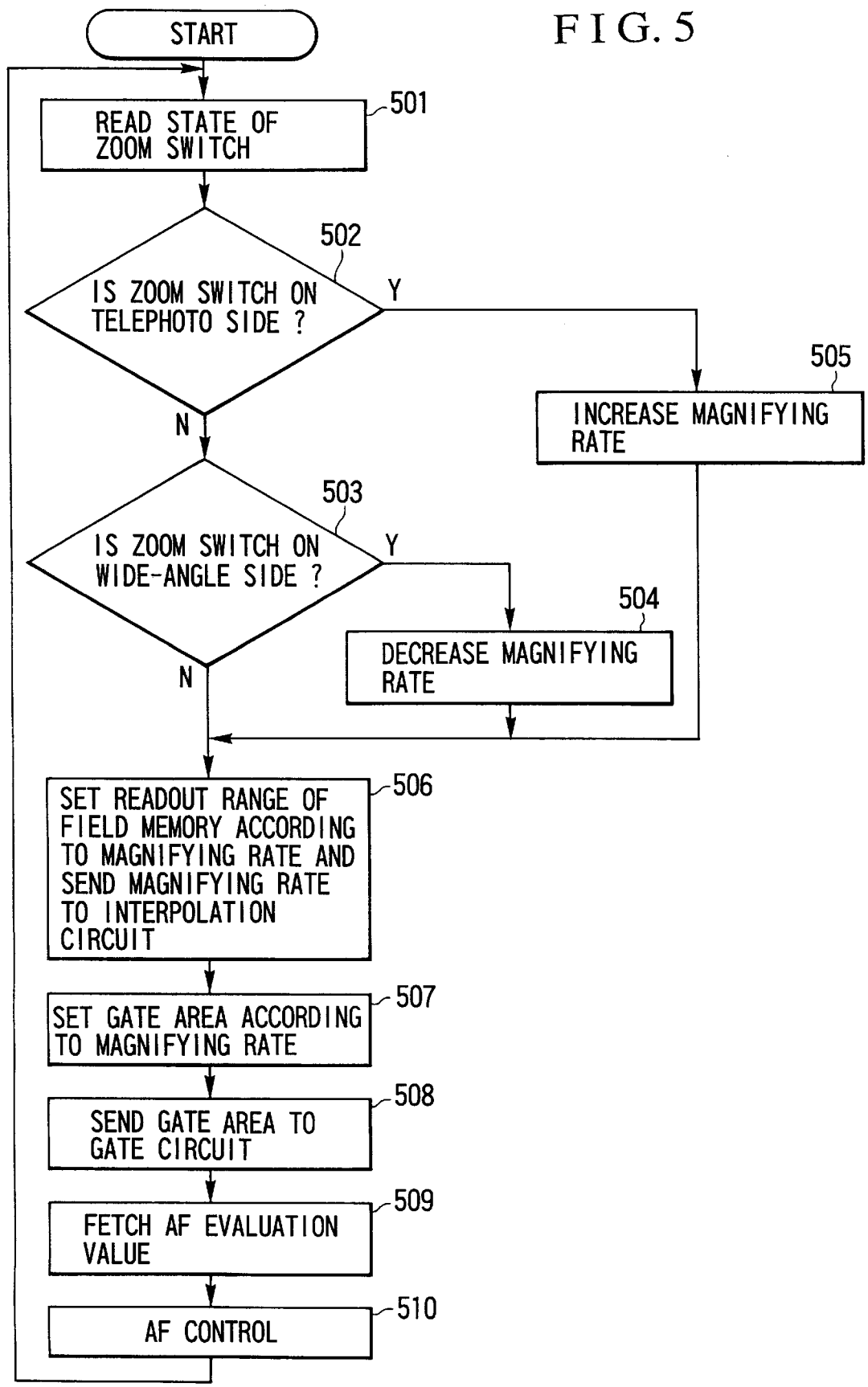
FIG. 5 is a flow chart showing a control operation of a camera AF microcomputer to be executed at the time of electronic zooming in the same embodiment of this invention.
Figure 6:
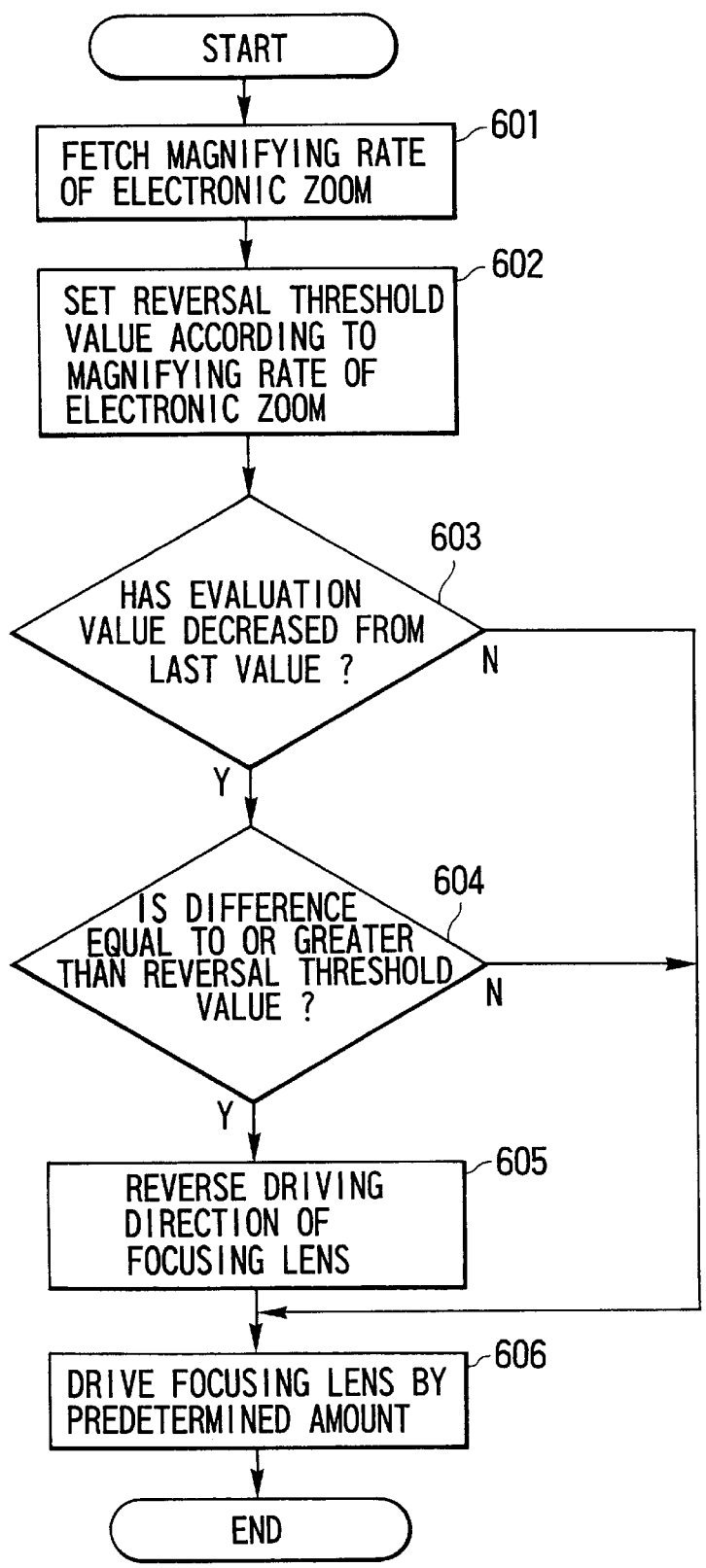
FIG. 6 is a flow chart showing an AF control operation of the camera AF microcomputer in the same embodiment of this invention.

In the case of the flow chart of FIG. 5, the electronic zoom function is activated when the zoom switch 119 is operated.

Referring to FIG. 5, at a step 501 after the start of the flow of control operation, the operated state of the zoom switch 119 is read. At a step 502, a check is made to find if the zoom switch 119 is pushed on the telephoto side thereof. If not, the flow comes to a step 503. If so, the flow comes to a step 505.

At the step 503, a check is made to find if the zoom switch 119 is pushed on the wide-angle side thereof. If so, the flow comes to a step 504. If not, the flow comes to a step 506.

At the step 504, since a zooming action is to be performed toward the wide-angle end, the magnifying rate is decreased. At the step 505, since a zooming action is to be performed toward the telephoto end, the magnifying rate is increased. Then, the flow comes to the step 506.

At the step 506, information on the magnifying rate set by the zoom switch 119 is sent respectively to the field memory 116 and the interpolation circuit 117. A readout range according to the magnifying rate is set at the field memory 116 as described in the foregoing. Then, the interpolation circuit 117 is instructed to interpolate information dropout parts which must be interpolated according to the magnifying rate. In response to this instruction, the interpolation circuit 117 interpolates the magnified image. An electronic zoom action is thus carried out.

At a step 507, gate area control information is computed for control over the gate area of the gate circuit 114 for setting the focus-evaluation-value extracting range at an apposite value according to the magnifying rate of the electronic zooming decided through the preceding steps. At a step 508, the gate area control information thus decided is sent to the gate circuit 114 to set a focus-evaluation-value extracting area.

Since the readout range within the picture plane is reduced further accordingly as the magnifying rate of the electronic zooming increases, the focus-evaluation-value extracting range is controlled to be reduced according to the reduction in the readout range for ensuring that no information obtained outside of the readout range is included in the focus-evaluation-value extracting range.

Figure 4:
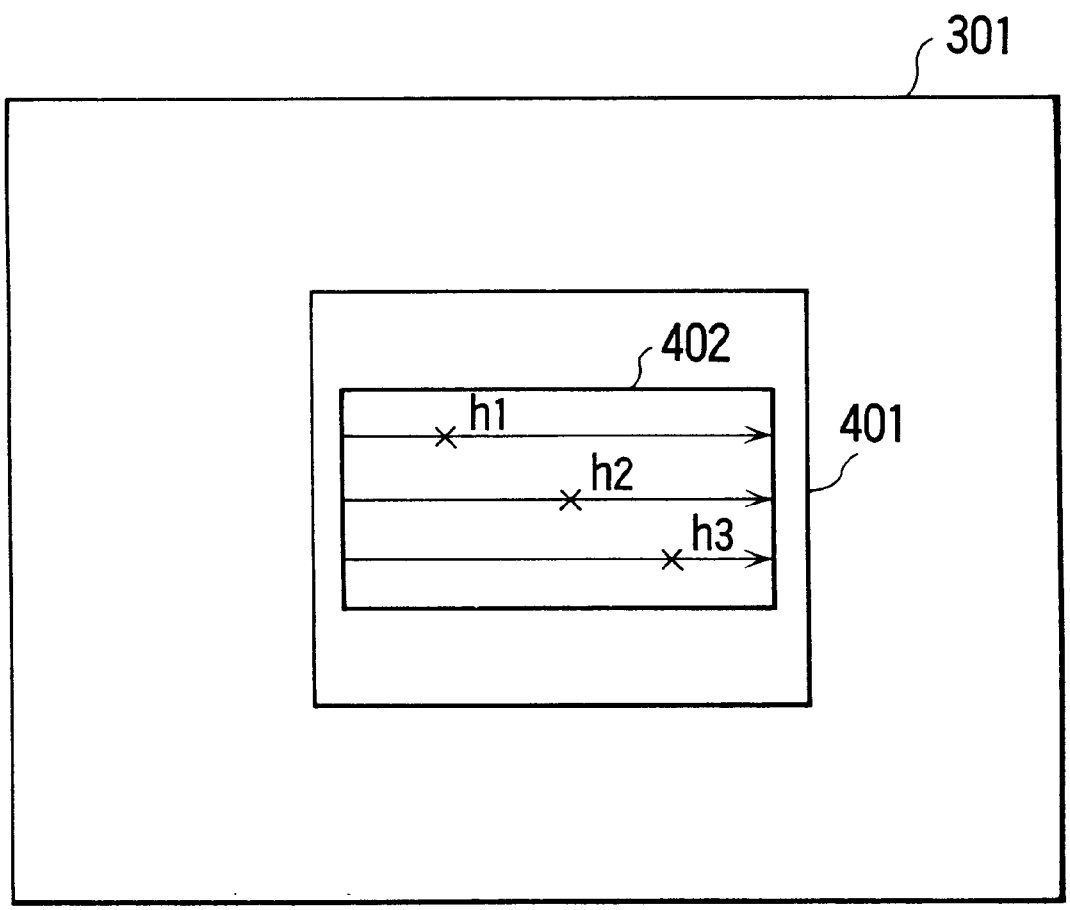
FIG. 4 shows a focus-evaluation-value extracting range in relation to an image pickup plane magnified by electronic zooming.

FIG. 4 shows the focus-evaluation-value extracting range obtained according to this invention in a case where the image pickup plane is magnified two diameters by the electronic zooming. In FIG. 4, reference numeral 301 denotes an image pickup range obtained prior to the magnification. Reference numeral 401 denotes a readout range of reading from the field memory 116, i.e., an image pickup range to be magnified. Reference numeral 402 denotes the focus-evaluation-value extracting range which has been changed according to the magnifying rate of the electronic zooming in the case of this embodiment. As apparent from the illustration, the focus-evaluation-value extracting range 402 is controlled so as to be within the image pickup range 401 which is to be magnified.

The camera AF microcomputer 118 is arranged to provide a control to make a ratio of the focus-evaluation-value extracting range to the image pickup range always constant irrespective of whether the image pickup range is magnified by the electronic zooming or not. Therefore, turning-on or turning-off of the electronic zooming and changes of the magnifying rate of the electronic zooming never cause sudden changes in the state of focus adjustment nor any erroneous focusing on a wrong object outside of the picture plane. The focus adjusting action thus can be always steadily carried out to ensure a stable image pickup operation.

The processes described above effectively prevent focusing on any object located outside of the picture plane, to ensure reliable and accurate focus adjustment.

At a step 509, a focus evaluation value, i.e., a high frequency component of the video signal, corresponding to the focus-evaluation-value extracting range set at the step 508 is fetched from the AF evaluation value processing circuit 115. At a step 510, the driver 113 and the actuator 112 are controlled to drive and move the focusing lens 105 to an in-focus point where the focus evaluation value becomes a maximum value.

With the steps described above repeated, the AF evaluation value is obtained by optimizing the setting of the focus-evaluation-value extracting range according to the magnifying rate of the electronic zooming. The focus adjustment thus can be accurately carried out without focusing on a wrong object located outside of the picture plane even while the electronic zooming is in process. AF control thus can be stably and accurately carried out irrespective of the magnifying rate and its changes of the electronic zooming.

It is an advantageous feature of this invention that, when the size of the focus-evaluation-value extracting range is caused to change by electronic zooming, an operation of the focus adjusting means is restricted, so that the operation of the focus adjusting means is not made unstable, as will be described in the following.

FIG. 6 is a flow chart showing the details of the AF control at the step 510 of FIG. 5. Referring to the flow chart of FIG. 6, at a step 601 after the start of the flow of operation, information on the magnifying rate of the electronic zooming is fetched. At a step 602, the above-mentioned reversal threshold value is set according to the magnifying rate of the electronic zooming.

Assuming that a normal reversal threshold value is "a", the reversal threshold value is set to "a/2" when the magnifying rate of the electronic zooming is at two diameters. In other words, since the level of the focus evaluation value comes to vary by a smaller amount with the area from which the focus evaluation value is obtained caused to become smaller, the reversal threshold value is set to a smaller value accordingly.

At a step 603, a check is made to find if the focus evaluation value has decreased from the value last obtained. If so, the flow comes to a step 604. If not, the flow comes to a step 606.

At the step 604, a check is made to find if a difference between the current and last focus evaluation values is equal to or larger than the reversal threshold value set at the step 602. If so, the flow comes to a step 605. At the step 605, the driving direction of the focusing lens 105 is reversed, and the flow comes to the step 606 to drive the focusing lens 105 a predetermined amount to finish the process. The flow then comes back to the flow of operation shown in FIG. 5.

If the difference between the current and last focus evaluation values is found at the step 604 to be less than the reversal threshold value set at the step 602, the flow comes to the step 606. Then, the focusing lens 105 is moved further in the current moving direction to finish the process. The flow then comes back to the flow of operation of FIG. 5.

As described above, when the image is magnified by the electronic zoom action, the focus-evaluation-value extracting rate is changed according to the magnifying rate, so that the lens can be prevented from being erroneously focused on a wrong object located outside of the image pickup range. Further, with the focus-evaluation-value extracting range changed, deterioration of the performance of or a malfunction of the focus adjusting means due to a change in level of the focus evaluation value caused by the change of the focus-evaluation-value extracting range can be effectively compensated by changing the reversal threshold value in such a way as to restrict the operation of the focus adjusting means.

More specifically, a malfunction by which the lens is erroneously focused on an object located outside of the image pickup range is prevented by reducing the focus-evaluation-value extracting range according to the image magnifying rate. Any erroneous operation of the focus adjusting means that possibly results from a lowered level of the focus evaluation value caused by the reduction of the focus-evaluation-value extracting range is compensated by reducing the reversal threshold value. The focus thus can be steadily and accurately adjusted.

In the case of the embodiment described, the focus-evaluation-value extracting range is reduced according to the image magnifying action of the electronic zooming. However, the arrangement according to this invention of course applies also to a case where the focus-evaluation-value extracting range is to be changed although there is no electronic zooming action.

According to the arrangement of the embodiment described, when the focus-evaluation-value extracting range is changed, the reversal threshold value is reduced according to the new focus-evaluation-value extracting range, so that the focus adjustment can be steadily and accurately made. The AF control thus can be accurately and stably carried out.

With the reversal threshold value reduced according to the magnifying rate while the electronic zooming is in process, the focus can be accurately adjusted without unstably varying the focus during the process of magnifying the image by the electronic zooming. The AF control thus can be stably accomplished at a high degree of precision without causing any malfunction.

Further, with the reversal threshold value reduced for a new focus-evaluation-value extracting range according to the magnifying rate while the electronic zooming is in process, focus adjustment can be accurately made without unstably varying the focus. The AF control thus can be stably accomplished at a high degree of precision without causing any malfunction.

What is claimed is:

1. An image pickup apparatus comprising:

extracting means for extracting, as a focus evaluation value, a predetermined high frequency component of an image signal corresponding to an extracting range set within an image pickup plane;

focus adjusting means for adjusting focus state by moving a focus adjusting member to maximize the focus evaluation value;

extracting range varying means for varying the extracting range; and control means for setting a evaluation value for reversing a moving direction of said focus adjusting member and varying the evaluation value according to a change of the extracting range.

2. An apparatus according to claim 1, wherein said extracting means includes a band-pass filter.

3. An apparatus according to claim 1, wherein said control means is arranged to vary a condition for reversing a moving direction of said focus adjusting member, according to a size of the extracting range.

4. An apparatus according to claim 3, wherein said focus adjusting means is arranged to move said focus adjusting member in a direction of increasing a level of the focus evaluation value and to reverse a moving direction of said focus adjusting member when the level of the focus evaluation value decreases from a peak value thereof by a predetermined threshold value after the level of the focus evaluation value reaches the peak value.

5. An apparatus according to claim 4, wherein said control means is arranged to vary the threshold value according to the size of the extracting range.

6. An apparatus according to claim 5, wherein said control means is arranged to reduce the threshold value when the extracting range is reduced.

7. An image pickup apparatus comprising:

extracting means for extracting, as a focus evaluation value, a predetermined high frequency component of a video signal corresponding to an extracting range arbitrarily set within an image pickup plane;

moving means for moving a focus adjusting member along an optical axis;

focus adjusting means for adjusting focus by causing said moving means to move said focus adjusting member in such a way as to maximize the focus evaluation value;

image magnifying means for electrically magnifying an image within the image pickup plane; and control means for varying the extracting range according to a magnifying rate of said image magnifying means and for controlling an operation of said focus adjusting means according to a size of the extracting range.

8. An apparatus according to claim 7, wherein said focus adjusting member is a focusing lens.

9. An apparatus according to claim 8, wherein said image magnifying means includes an image memory and is arranged to perform an image magnifying process by varying a readout range set on said image memory.

10. An apparatus according to claim 9, further comprising interpolation means for interpolating between picture elements or between scanning lines of an image read out from said image memory.

11. An apparatus according to claim 9, wherein said focus adjusting means is arranged to move said focus adjusting member in a direction of increasing a level of the focus evaluation value and to reverse a moving direction of said focus adjusting member when the level of the focus evaluation value decreases from a peak value thereof by a predetermined threshold value after the level of the focus evaluation value reaches the peak value.

12. An apparatus according to claim 11, wherein said control means is arranged to vary the threshold value according to the size of the extracting range.

13. An apparatus according to claim 12, wherein said control means is arranged to reduce the threshold value when the extracting range is reduced.

14. A focus control apparatus comprising:

extracting means for extracting, as a focus evaluation value, a predetermined high frequency component of an image signal corresponding to an extracting range set within an image pickup plane;

focus adjusting means for adjusting focus state by moving a focus adjusting member to maximize a focus evaluation value;

extracting range varying means for varying the extracting range; and control means for setting a evaluation value for reversing a moving direction of said focus adjusting member and varying the evaluation value in responsive that a size of the extracting range is changed.

15. An apparatus according to claim 14, wherein said extracting means includes a band-pass filter.

16. An apparatus according to claim 14, wherein said control means is arranged to vary a condition for reversing a moving direction of said focus adjusting member, according to a size of the extracting range.

17. An apparatus according to claim 16, wherein said focus adjusting means is arranged to move said focus adjusting member in a direction of increasing a level of the focus evaluation value and to reverse a moving direction of said focus adjusting member when the level of the focus evaluation value decreases from a peak value thereof by a predetermined threshold value after the level of the focus evaluation value reaches the peak value.

18. An apparatus according to claim 17, wherein said control means is arranged to vary the threshold value according to the size of the extracting range.

19. An apparatus according to claim 18, wherein said control means is arranged to reduce the threshold value when the extracting range is reduced.

* * * * *

UNITED STATES PATENT AND TRADEMARK OFFICE
CERTIFICATE OF CORRECTION

PATENT NO. : 6,166,770
DATED : December 26, 2000
INVENTOR(S) : Hitoshi Yasuda

It is certified that error appears in the above-identified patent and that said Letters Patent is hereby corrected as shown below:

<u>Column 4,</u>
Line 66, delete "actuator." and insert -- actuator --.

Signed and Sealed this

First Day of January, 2002

Attest:

Attesting Officer

JAMES E. ROGAN
*Director of the United States Patent and Trademark Office*